3,832,356
ACETAL DIMERS OF CYCLIC ACETALS
Glenn M. Nakaguchi and Ting-I Wang, Fullerton, and
 Frederick F. Caserio, Jr., Laguna Beach, Calif., assignors to Atlantic Richfield Company, Philadelphia, Pa.
No Drawing. Original application July 15, 1969, Ser. No. 841,983, now Patent No. 3,714,202, dated Jan. 30, 1973. Divided and this application Oct. 24, 1972, Ser. No. 300,046
Int. Cl. C07d 13/04
U.S. Cl. 260—340.9     1 Claim

ABSTRACT OF THE DISCLOSURE

The acetal dimer of the cyclic acetal of a triol is a useful intermediate in the catalytic synthesis of two classes of vinyl cyclic acetal compounds, 2-methyl-5-vinyloxy-1,3-dioxane and 2-methyl-4-vinyloxymethyl-1,3-dioxolane.

This is a divisional of application Ser. No. 841,983, filed July 15, 1969, now U.S. Pat. 3,714,202 of Jan. 30, 1973.

BACKGROUND OF THE INVENTION

Field of the Invention

This invention relates to the preparation of 2-methyl-5-vinyloxy-1,3-dioxane and 2-methyl - 4 - vinyloxymethyl-1,3-dioxolane by catalytic pyrolysis of glycerol acetal dimers produced by the addition reaction of 1,1-dialkoxyethane or acetaldehyde with glycerol.

SUMMARY OF THE INVENTION

The objects of this invention are accomplished, generally, by a three step process for producing vinyl cyclic acetals. In step one, 1,1-dialkyoxyethane is produced by catalytic oxidation of an ethylene-alcohol mixture. Polyol acetal dimers are produced in step two by the exchange reaction of 1,1-dialkoxyethane with a triol using an acid catalyst, such as p-toluenesulfonic acid or from acetaldehyde and a triol, using a like catalyst. The preparation of the vinyl cyclic ethers of this invention in step three involves the catalytic pyrolysis of the triol acetal dimers of step two to a mixture of vinyl cyclic acetals and triol acetals. The product, the vinyl glycerol acetals, is separated from the triol acetals by extraction with an alkane-polyol solvent system. The vinyl triol acetal mixture is recovered from pentane by distillation. The polyol layer containing the triol acetal is recycled as feed to step two.

An exemplary reaction scheme is given below:

FIRST STEP

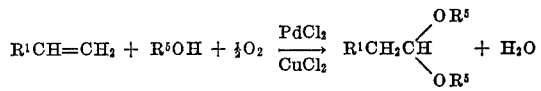

SECOND STEP

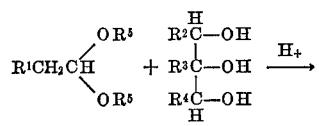

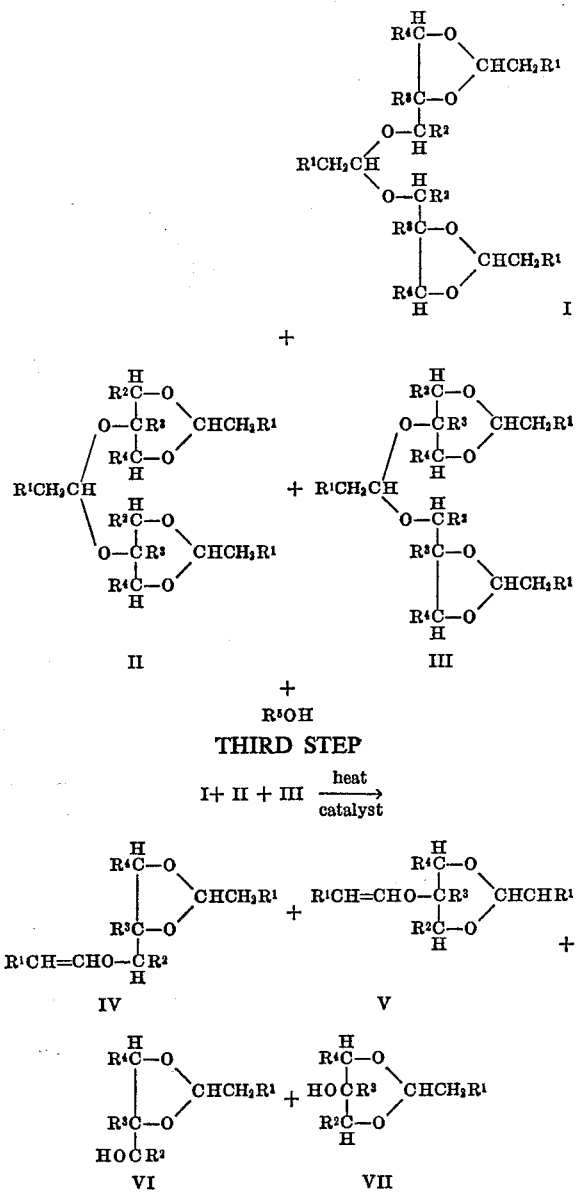

$R^1$ in the above equations, is preferably hydrogen, since the unsubstituted vinyl group in the final product is more reactive than substituted vinyl groups, but may be lower alkyl, e.g., methyl or ethyl, for producing substituted vinyl compounds. $R^2$, $R^3$, and $R^4$ are hydrogen or lower alkyl, e.g., methyl, ethyl, propyl, etc., groups. $R^5$ is preferably methyl or ethyl but may be any lower alkyl, aryl, or aralkyl group which is sufficiently soluble in polar media to permit efficient reaction with a polyglycol. In step two, 1,1-dialkoxyethane is preferred but acetaldehyde reacts in the same manner to produce the same compounds I, II, and III.

It is, therefore, a principal object of this invention to provide novel vinyl cyclic acetal compounds and a process for preparing the same.

It is a more specific object of this invention to provide a class of vinyloxydioxanes and vinyloxydioxolanes as polymerization monomers.

A further specific object of the invention is to provide a novel process for producing vinyloxydioxanes and vinyloxydioxolanes.

A further and more specific object of the invention is to provide a novel method for producing 5-vinyloxydioxanes and 4-vinyloxymethyl dioxolane A further object of the invention is to provide compounds of the formulas

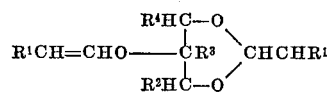

and

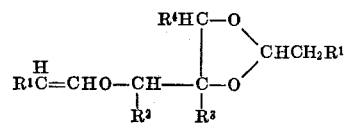

wherein $R^1$, $R^2$, $R^3$ and $R^4$ are hydrogen or lower alkyl groups.

An additional object is to provide a process for preparing the foregoing compounds simultaneously.

An additional and distinct object of the invention is to provide a process for separating vinyl cyclic acetals from polyol cyclic acetals.

A more specific object of the invention is to produce a method of separating vinyl cyclic acetals from free hydroxyl containing compounds using a polar-nonpolar solvent system.

An additional object of the invention is to provide a novel process for producing vinyl compounds by reacting an aldehyde or acetal with a polyglycol to produce cyclic acetals and catalytically pyrolyzing the cyclic acetal.

A highly specific and non-limiting object of the invention is to provide a method for simultaneously producing 2-methyl-5-vinyloxy-1,3-dioxane and 2-methyl-4-vinyloxymethyl-1,3-dioxolane.

Additional objects will be apparent from the discussion which follows.

DESCRIPTION OF THE PREFERRED EMBODIMENTS

The preferred embodiment of this invention comprises a three step process, although the first step may be omitted without significant detriment to the overall process.

The first step comprises the preparation of an acetal in either a one stage or a two stage operation. The acetal, 1,1-dialkoxyethane involves the reaction of ethylene with a lower alkyl alcohol, e.g., methanol, ethanol, propanol, etc. Methanol and ethanol are preferred.

The one stage operation involves passing a gaseous mixture of ethylene and oxygen through an alcoholic solution containing a catalyst system. The preferred catalyst system is a $PdCl_2$-$CuCl_2$ composite. $CuCl_2$ serves as a cocatalyst and aids in the regeneration of $PdCl_2$ which is reduced during the foregoing reaction.

The two stage operation involves, first, reacting ethylene with alcohol to form 1,1-dialkoxyethane with simultaneous reduction of the $PdCl_2$-$CuCl_2$ catalyst system and, secondly, regenerating the catalyst system with oxygen after the 1,1-dialkoxyethane has been removed by distillation. Obviously, the two reaction schemes are chemically identical, although the physical manipulations differ.

The first step reactions may be carried out at temperatures from about 50° C. to about 200° C., preferably between 75° C. and 100° C. under a pressure of from 1 to 100 atmospheres. Reaction times from a fraction of an hour to 10 or more hours may be used. The foregoing reaction conditions are preferred but variations in reaction conditions and catalysts may be made, e.g., according to the principles set forth in application Ser. No. 708,772, filed Feb. 28, 1968, by Glenn M. Nakaguchi and Frederick F. Caserio, Jr., the disclosure of which is incorporated herein.

The second step of the reaction scheme is carried out by the exchange reaction of a 1,1-dialkoxyethane with a triol using an acid catalyst. Alternatively, the triol acetal dimers may be prepared from acetaldehyde and the triol under similar conditions. This alternative eliminates the first step if acetaldehyde is purchased or produced according to known methods, e.g., the Wacker process.

Similarly, 1,1-dialkoxypropanes and 1,1-dialkoxybutanes, etc., produce analoguos compounds wherein $R^1$ is a lower alkyl group, rather than hydrogen. Likewise propionaldehyde or butyraldehyde may be used directly in the process, in substitution for acetaldehyde.

Polyglycols useful in the second step of the reaction include those polyols which have at least three reactive hydroxyl groups, for example, 1,2,6-hexanetriol, 1,3,6-hexanetriol, glycerol, sorbitol, pentaerythritol, diglycerol, 1,1,1-trimethylol propane and 1,4,7-heptanetriol and mixtures thereof. The preferred polyols are triols generally, for example glycerol, 1,1,1-trimethylol propane, 1,3,6-hexanetriol, 1,4,7-heptanetriol, etc. In addition, polymeric substances highly useful as wetting agents, flocculent aids, etc. may be polymerized from monomers produced according to the present invention starting with polyalkylene oxide ethers of polyols, e.g., glycerol having the following general structure:

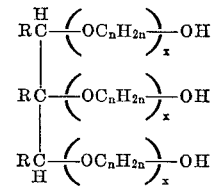

wherein R is hydrogen or a lower alkyl, $n$ is a positive integer from 1 to 3 and $x$ is a positive integer from 1 to 10, inclusive. Obviously, other polyalkylene oxide polyol ethers may likewise be used. Using the above product, wherein R is H and $n$ is 2, the following product would result in a reaction with 1,1-diethoxyethane after pyrolysis:

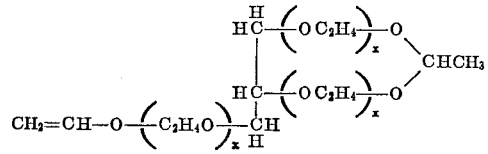

Vinylic polymerization of the above product will result in a low molecular weight, highly hydrophilic material.

Step two of the reaction scheme is carried out preferably with an organic acid catalyst, such as sulfosalicylic acid, para-toluenesulfonic acid, and acidic ion exchange resins, although any essentially acid catalyst is satisfactory. Reaction times range from about 1 hour to about 36 or more hours, reaction temperatures, in the preferred reaction process are largely controlled by the boiling point of the aldehyde or dialkoxy alkane derivative and range, generally, from about 50° C. to about 150° C. Pressures of from less than 1 atmosphere to about 100 atmospheres may be used, atmospheric pressure is preferred for convenience although sub-atmospheric pressures are expected to give slightly improved yields.

Step three involves the pyrolysis of the polyol acetal dimers from step two over a catalyst to form a mixture of vinyl cyclic acetals and glycerol acetals. Phosphates generally, acid catalysts, such as sodium dihydrogen phosphate and aluminum phosphate, silica gel, molecular sieves and charcoal are effective catalysts. The preferred catalyst is sodium dihydrogen phosphate. The reaction is preferably carried out in a flowing stream with a catalyst contact time of from about 1 to about 100 seconds, preferably in the range of about 10 seconds at a temperature of from 150° C. to 300° C. and preferably in the range of 175° C. to 250° C. Pressures from less than 1 atmosphere to about 10 atmospheres and, preferably, about 1 atmosphere are useable. The process variable limits have not, however, been determined with precision.

EXPERIMENTAL

The step one reaction, the production of 1,1-dialkoxyethane by the one stage process, was carried out at 90° C. and 50 p.s.i.g. for 4 hours in an unstirred glass tube reactor 30 inches long and 1 inch in diameter. The catalyst mixture consisted of 0.004 mole palladium chloride and 0.15 mole of cupric chloride in 200 ml. (5 moles) of methanol. Two reactions were performed using a 95 percent ethylene-5 percent oxygen gas mixture. One run gave a 6.4% conversion of ethylene with the following selectivities: dimethoxyethane, 85.2%; acetaldehyde, 10.6%; and methyl acetate, 4.2%. Another run gave a 7.6% conversion of ethylene with about the same selectivity. In another run, using a 90% ethylene-10% oxygen gas mixture and anhydrous cupric chloride in place of the dihydrate salt previously used, the ethylene conversion was 11.5% with little change in selectivity.

The same reaction was carried out in a two stage process. These runs were performed in a 6 oz. glass reactor containing 0.0014 mole of palladium chloride and 0.05 mole of anhydrous cupric chloride in 1.22 mole (50 ml.) of methanol. A complete cycle consisted of (1) reacting the methanol with the ethylene at 150 p.s.i.g. and 90° C. for 15 minutes, (2) distilling the product from the reaction mixture and replenishing the co-distilled methanol and (3) regenerating the catalyst system with oxygen at 150 p.s.i.g. and 65° C. for 15 minutes. Six and one-half cycle runs gave the following yields of 1,1-dimethoxyethane: 88%, 84%, 100%, 103%, 95%, 114% and 98% respectively. Acetaldehyde, butenes, methyl chloride, 1,1-dimethoxymethane and 1-chloro-2-methoxyethane were present as side products.

Under the same conditions, methanol was replaced with ethanol and good yields of diethyl acetal were obtained along with small amounts of acetaldehyde and ethyl vinyl ether.

In one experiment, 0.21 mole of the product of the preceding process, 1,1-diethoxyethane, and 0.11 mole of glycerol, along with a trace of sulfosalicylic acid as a catalyst, were equilibrated overnight under reflux. The ethanol and excess acetal were distilled from the reaction mixture. A mixture of compounds I, II, and III in 20–30% yield, as determined by gas chromatography, was found in the reaction product. The major component, however, was a mixture of glycerol acetals.

In another experiment, 1.7 moles of 1,1-diethoxyethane, 0.85 mole of glycerol and 0.2 gram of sulfosalicylic acid catalyst were equilibrated at reflux temperature for 16 hours. The ethanol which was formed in the reaction and the excess acetal were slowly distilled from the reaction mixture, leaving a mixture of glycerol acetals and glycerol acetal dimers, I, II, and III. Distillation of the crude products, after neutralization with anhydrous potassium carbonate, yielded three fractions. Fraction A boiled from 62 to 85° C., at 8 mm. Hg pressure, and was present in 50 percent yield. This product was determined to be glycerol acetal. Fraction B boiled, at the same pressure, from 85 to 100° C. The yield was not determined. It is believed that this mixture was a mixture of glycerol acetals and the glycerol acetal dimers I, II and III. Fraction C boiled from 120° C. to 135° C., at 8 mm. Hg, and was present in 30% yield. This fraction was determined to contain the desired products, I, II and III along with a small amount of trans-2-methyl-1,3-dioxane-5-ol. Yields are based on glycerol.

In a further experiment, 0.054 mole of glycerol and 0.108 mole of 1,1-diethoxyethane and a trace of p-toluene sulfonic acid catalyst were refluxed for 1 hour in a small round bottomed flask. The ethanol-acetal azeotropic mixture was distilled from the reaction mixture to yield 9.36 grams of the distillate. The above process was repeated with the addition of another 0.108 mole of 1,1-diethoxyethane. The second distillation yielded 13.2 grams of liquid. The reaction mixture was neutralized with potassium carbonate and analyzed by gas chromatography using methyl benzoate as an internal standard. A yield of 52% glycerol acetal dimers, products I, II and III, based on glycerol, was obtained from this reaction.

Under reaction conditions similar to the preceding experiment, 1,1-diethoxyethane was added in 4 increments of which the first increment was 0.081 mole and the 3 succeeding increments were 0.04 mole of 1,1-diethoxyethane. The reaction was performed by equilibrating the mixture at reflux for approximately 1 hour and then distilling the ethanol-acetal mixture from the reaction flask. Samples taken after each distillation showed 9% yield of the glycerol acetal dimer after the first distillation, 63% yield after the second distillation, 87% yield after the third distillation and 88.3% yield of the glycerol acetal dimers I, II and III upon final analysis.

A similar experiment using six additions of 1,1-dimethoxyethane yielded similar results.

The glycerol acetal dimers were also prepared by reacting acetaldehyde with glycerol in a 3:2 molar ratio. The water formed during the reaction was removed by azeotropic distillation with benzene using a Dean-Stark trap. The yield of glycerol acetal dimers was 43%. The reaction mixture comprised 15.4 grams of acetaldehyde, 20.2 grams of glycerol, 0.2 gram of p-toluenesulfonic acid and 50 ml. of benzene.

Vinyl glycerol acetal synthesis, step three, was accomplished through vapor phase pyrolysis of the glycerol acetal dimers of the preceding step over an acid catalyst, e.g., sodium dihydrogen phosphate.

It is expected that adaptations will be made without departing from the spirit and scope of the invention as defined in the claim which follows.

We claim:
1. A compound of the formula

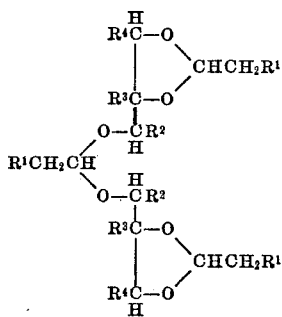

wherein each of $R^1$, $R^2$, $R^3$ and $R^4$ is independently selected from the group consisting of hydrogen, methyl, ethyl, and propyl.

References Cited
UNITED STATES PATENTS 2,636,884  4/1953  Tenebaum et al. ____ 260—340.9
3,293,219  12/1966  Gottesman et al. ____ 260—340.9
3,644,423  2/1972  Roswell et al. _____260—340.9

DONALD G. DAUS, Primary Examiner

J. H. TURNISPEED, Assistant Examiner

U.S. Cl. X.R.

252—522; 260—340.7